United States Patent [19]

Johansson

[11] Patent Number: 5,450,224
[45] Date of Patent: Sep. 12, 1995

[54] METHOD AND ARRANGEMENT FOR OPTICAL SWITCHING

[75] Inventor: Sonny Johansson, Enskede, Sweden

[73] Assignee: Telefonaktiebolaget LM Ericsson, Stockholm, Sweden

[21] Appl. No.: 801,897

[22] Filed: Dec. 3, 1991

[30] Foreign Application Priority Data

Dec. 7, 1990 [SE] Sweden .................... 9003914

[51] Int. Cl.$^6$ .......................................... H04J 14/00
[52] U.S. Cl. ..................... 359/128; 359/119; 359/133
[58] Field of Search ............... 359/123, 124, 127, 128, 359/133, 119

[56] References Cited

U.S. PATENT DOCUMENTS 5,005,166  4/1991  Suzuki .................... 359/123

FOREIGN PATENT DOCUMENTS 0264119  4/1988  European Pat. Off. .
0220688  9/1988  Japan .................... 359/123

OTHER PUBLICATIONS

"Technical Digest" 1990 Int'l Topical Meeting on Photonic Switching, Apr. 12–14, 1990, pp. 176–178.
"A Photonic Wavelength-Division Switching System Using Tunable Laser Diode Filters" Journal of Lightwave Technology, vol. 8, No. 5, May 1990, pp. 660–665.
"A Coherent Photonic Wavelength-Division Switching System for Broad-Band Networks" Journal of Lightwave Technology, vol. 8, No. 3, Mar. 1990, pp. 416–421.

*Primary Examiner*—Leslie Pascal
*Attorney, Agent, or Firm*—Burns, Doane, Swecker & Mathis

[57] ABSTRACT

An optical switch for switching wavelength multiplexed optical signals between N input links and M output links is disclosed. The optical switch contains a first plurality of input terminals, optical splitters, tunable optical wavelength filters, optical switching elements, transmitters and optical couplers. In addition, the optical switch also contains a second plurality of output terminals, optical couplers, receivers, and optical splitters. Controllers control the first tunable wavelength optical filters, transmitters, and the receivers, selecting wavelengths for each from among 2n-1 different wavelengths so as to prevent two identical wavelengths from occurring simultaneously in any one of the input links and output links.

9 Claims, 3 Drawing Sheets

METHOD AND ARRANGEMENT FOR OPTICAL SWITCHING

TECHNICAL FIELD

The present invention relates to a method and to an arrangement for optically switching wavelength multiplexed optical signals. More specifically, the invention relates to a method for switching groups of optical signals from inputs of an optical switch to outputs of said switch in an optically uninterrupted fashion, wherein each group is transmitted on a respective optical link and the signals in each group are wavelength multiplexed. The optical switch in accordance with the invention may be implemented with a strict non-blocking feature.

BACKGROUND ART

Optical switching, so-called photonic switching, is described in the publication "Technical Digest" 1990, International Topical Meeting on Photonic Switching, April 12–44, 1990, pages 176–178. The article describes an optical switching network which enables optical signals on the input side of the optical switch to be redistributed to different outputs on the output side of the switch. In order to ensure that two different signals on one and the same switch output will not obtain the same wavelength, since this would prevent the two signals from being distinguished from one another, a wavelength converter is arranged at the switch inputs. These wavelength converters are electrically operated converters. This is disadvantageous, since the optical transparency through the switch is lost. An optical transparent switch is capable of switching optical signals independently of the bit of rate and coding of the optical signals.

Described in the "Journal of Lightwave Technology", Vol. 8, No. 5, May 1990, pages 660–665, is an optical switch for wavelength multiplexed optical signals. Signals which arrive at the switch on one wavelength shall depart from the switch on another wavelength and optical modulators which comprise optical non-linear elements are used to this end. The non-linear effect is, however, very weak in practice and consequently the input light must be of very high intensity in order to achieve wavelength conversion. No optical non-linear devices which will operate effectively in practice are available at present, and consequently the authors of the article have replaced these devices with optical-electrical converters in the review of the experiments carried out. Such optical-electrical converters are disadvantageous for the reasons stated above.

In another issue of the publication "Journal of Lightwave Technology", Vol. 8, No. 3, March 1990, pages 416–421, there is described an optical switch with which wavelength conversion is effected with the aid of an intermediate frequency filter which operates outside the optical wavelength field. This arrangement thus has the limitations described above.

In certain applications an optical switch has to switch the input optical signals through the switch in a strictly blocking-free fashion. Strictly blocking-free fashion means that a signal at the input of the switch can find its way through the switch out into a free wavelength channel at the output link from the switch. By blocking is meant the simultaneous occurrence of two identical wavelengths on one and the same link.

Consider the following example which illustrates an optical switch wherein blocking occurs. Suppose the wavelength channels of an output link from the switch all are occupied except one. The free wavelength channel at the output corresponds to a wavelength $\lambda_1$. Now suppose that there is a first signal having the wavelength $\lambda_1$ at the input link and that this signal is switched to another output link than the one considered. Since the wavelength $\lambda_1$ is occupied by the first signal a second signal, also having the wavelength cannot be used on the same input link. Accordingly the free output wavelength channel remains unused and the switch is said to be blocked.

To cancel the blocked condition above it is common to loosen the rather tight blocking-free requirement and instead operate the optical switch in a rearranged blocking-free fashion. In a rearranged blockig-free switch a wavelength channel which is already set up is shifted to a new wavelength selected amongst those which are possible to use for the already set up channels. Rearrangment may imply interruption in the transmission of already set up wavelength channels.

A disadvantage with known optical switches provided with opto-electrical converters is that the switches are dependent on the bit rate and code format of the optical signals to be switched. This impedes future extension and upgrading of existing networks, in which optical switches of such kind are used, since the switches must be changed if for example a higher bit rate or a new coding scheme of the signals should be introduced into the network.

DISCLOSURE OF THE INVENTION

An object of the present invention is to provide an optical switch by means of which wavelength multiplexed optical signals can be switched in an optically uninterrupted fashion through the switch, said optical switch being transparent to the bitrate and code format of the optical signals.

An advantage achieved with the optical switch in accordance with the invention is that the switch can be used in telecommunication networks that can be rearranged without the need to change switch nodes which are provided with the optical switches in accordance with the invention. End nodes in the network can be changed and upgraded without the need to change the optical switches themselves.

Although the optical switch in accordance with the invention as described so far may operate in a rearrangable blocking-free fashion another object of the invention is to provide an optical switch which may operate in a strictly non-blocking fashion.

This object is achieved in accordance with the invention by extending the wavelength domain for the frequency multiplied signals that are transmitted on an optical link to 2n-1 wavelengths. Thus, at most a predetermined number of n wavelengths chosen from among said 2n-1 wavelengths can be transmitted on each link.

This procedure ensures that a sufficiently large number of wavelengths are found available for transmission purposes without risk of blocking either input or output links to and from the optical switch respectively.

The key element of the optical switch resides in the use of tunable optical wavelength filters of known kind. These optical wavelength filters can be tuned to each of said 2n-1 wavelengths for assigning wavelengths to the signals on each link such that no blocking will occur.

This assignment of wavelengths to each link is controlled by control means.

According to still another embodiment of the invention, the optical switch is supplemented with a digital cross connector such as to form an optical cross connector which will enable changes to be made to the configuration in which input and output links are mutually connected. The digital cross connector also enables the wavelength channels of predetermined input links to be redistributed among the output links.

The wavelength filter used is preferably a so-called DBR-filter or DFB-filter, which only allow one wavelength to pass through and which also amplify the signal on this wavelength before said signal enters the optical switch. Such amplification is advantageous, since the wavelength filters are preceded by optical splitters, which give rise to splitting losses. Such splitting losses are compensated for by this amplification.

BRIEF DESCRIPTION OF THE DRAWINGS

The invention will now be described in more detail with reference to the accompanying drawings, in which

FIG. 1 illustrates an optical switch 1 which includes a schematically illustrated optical switching element 2 having two inputs 3 and 5 and two outputs 4 and 6. The optical switch 1 also includes four transmitters, which are realized in the form of four tunable wavelength filters 7, 9, 11, 13 and four receivers, which are also realized in the form of four tunable optical wavelength filters 8, 10, 11, 14. The wavelength filters 7, 9 are connected to the input 3 via an optical link 15. The wavelength filters 11, 13 are connected to the input 15 over an optical link 17. The output 4 is connected to the wave length filters 8 and 10 via an optical link 16, while the output 6 is connected to the wavelength filters 12 and 14 via another optical link 18. The links 15 and 17 are referred to as input links and the links 16, 18 are referred to as output links. In order to enable the signals to be identified, it is necessary to transmit optical signals of mutually different wavelengths on each link.

Figure 1:
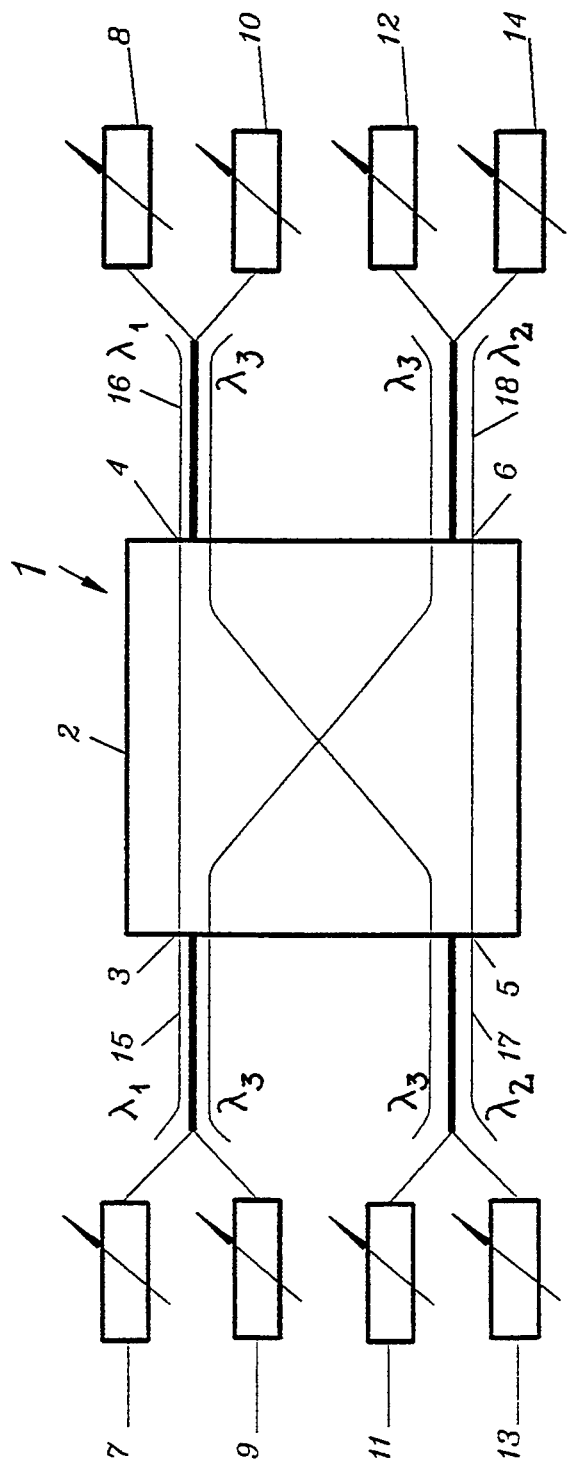
FIG. 1 illustrates the fundamental principles of the inventive method and inventive arrangement.

Consider the case in which the filter 7 is connected to the filter 8 by the switching element 2. Both of the filters 7 and 8 are so tuned as to only allow signals which have the wavelength $\lambda_1$ to pass through. The filter 13 is connected to the filter 14 via the switching element 2 and both of the filters 13, 14 are tuned so as to allow only optical signals which have the wavelength $\lambda_2$ to pass through. The wavelength filter 9 shall be connected to the wavelength filter 12, and the wavelength filter 11 shall be connected to the wavelength filter 10. If the wavelength filter 9 should now allow optical signals which have the wavelength $\lambda_2$ to pass through, the wavelength filter 9 would be blocked against connection to the filter 12, since optical signals having the wavelength $\lambda_2$ are already present in the output link 18 and, in a similar manner, the filter 11 would also become blocked against connection to the filter 10 should the filter 11 allow signals having the wavelength $\lambda_1$ to pass through, since signals of this wavelength are already present on the output link 16. The solution to this switching problem of connecting 9 with 12 and 11 with 10 lies in the introduction of a third wavelength $\lambda_3$ to which the filters 9, 12 and 11, 10 are tuned, since the wavelength $\lambda_3$ does not earlier occur, either in the output link 16 or in the output link 18.

The structure illustrated in FIG. 1 can be expanded to N number of input links and M number of output links, by expanding the wavelength range to include 2n-1 different wavelengths and by transmitting n number of different frequencies on each link simultaneously.

Figure 2:
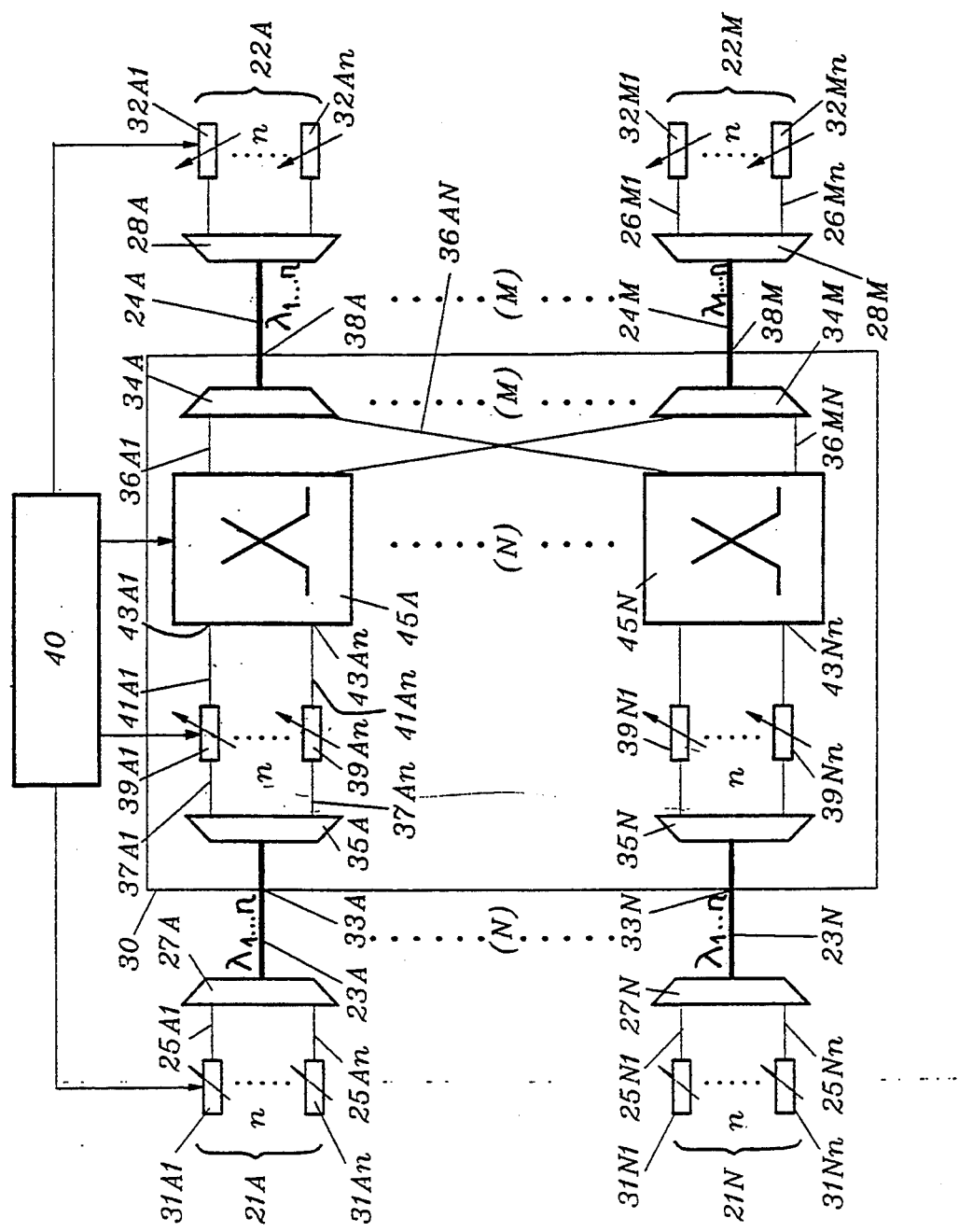
FIG. 2 illustrates an inventive optical switch.

FIG. 2 illustrates an optical switch 30 which enables N x n transmitters 21A-21M to be cross-connected optically to M x n receivers 22A-22N. The number of input links to and the number of output links from the optical switch has been reduced in a known manner, by using wavelength multiplexing. The input optical links have been marked in FIG. 2 with the reference signs 23A-23N and the output optical links with 24A-24M. The number of links on the input side has been reduced to N and the number of links on the output side of the optical switch has been reduced to M, by multiplexing n number of wavelength channels 25A1-25An, . . . , 25N1-25Nn in each link 23A-23N on the input side, and by multiplexing n number of wavelength channels 26A1-26An, . . . , 26M1-26Mn in each link 24A-24M on the output side. Normally, M equals N when it is not necessary to concentrate or expand the optical switch. The transmitters and the receivers are normally located at a long distance from the optical switch. Each link includes n number of transmitters and receivers respectively. On the transmitter side, N groups of each n transmitters are connected to a respective one of the optical links 23A-23N with the aid of a respective optical coupler 27A-27N of the type n:1. Groups of n receivers are connected to each output optical link 24A-24M with the aid of a respective optical splitter 28A-28M of the type 1:n. Receivers are also disposed at a distance from the optical switch 30. In each transmitter group of n transmitters and each receiver group of n receivers, each transmitter and each receiver respectively has simultaneous access to a unique wavelength channel. The optical switch 30 can switch any one of the input wavelength channels at each of the input optical links 23A-N independently to any of the output optical links 24A-M. If two or more wavelength channels lie on the same wavelength at different input optical links and if these two wavelength channels are addressed to one and the same output optical link, collision will occur and remaining channels, among them said two or more channels of mutually the same wavelength, will be blocked with the exception of one.

As mentioned in the introduction, many attempts have been made to achieve wavelength conversion in this state, although it has always been necessary to effect such conversion at the cost of interrupting the optical path through the switch.

According to the present invention, the wavelength domain is instead extended so that suitable wavelengths can be chosen already at the transmitters. The transmitters used to this end are tunable lasers, generally referenced 31A1-31An, . . . , 31N1-31Nn. It can be shown mathematically, compare the Clos principle, that the smallest number of available wavelengths in the wavelength domains shall be 2n-1 when n number of wavelengths are transmitted simultaneously on each link. Consequently, it shall be possible to tune each tunable laser 31 to 2n-1 different wavelengths.

The receivers used are also preferably lasers 32A1-32An, ..., 32M1-32Mn, each capable of being tuned to each of said 2n-1 different wavelengths.

The wavelength multiplied signals on each input link 23A-23N arrive at inputs 33A-33N on the optical switch 30. Each input has connected thereto a respective splitter 35A-35N of the 1:n type. Each splitter splits the input signals on a respective link into n number of branches. Thus, n branches 37A1-37An are formed on the optical splitter 35A, and a group of n branches 37M1-37Mn also exists at the output of the splitter 35N. One single wavelength is then selected from each branch, with the aid of a tunable optical wavelength filter, therewith creating n number of different wavelength channels 41A1-41An. Thus, a first group of n tunable optical wavelength filters 39A1-39An is found at the optical splitter 35A, a similar, second group of tunable wavelength filters is found at the next following splitter, etc., right down to the outputs of the optical splitter 35N at which a group of n tunable wavelength filters 39N1-39Nn is disposed in respective branches. Thus, a group of n wavelength channels is found at each splitter. The wavelength channels found at the splitter 35N are referenced 41N1-41Nn. Each tunable wavelength filter 39 is, for example, a DBR-filter (Distributed Bragg Reflector-filter) or a DBF-filter (Distributed FeedBack-filter). A tunable wavelength filter is a laser which is pumped optically to a moderate degree and which amplifies the signal transmitted by the filter, thereby to compensate for splitting losses. The transmitted signal may also be amplified prior to entering the following optical switching element.

Consider the splitter 35A. Since only one wavelength channel is permitted in each branch, the n number of wavelength channels will be distributed among n number of inputs 43A1-43An to an optical switching element 45A which forms part of the optical switch 30. Correspondingly, each of the optical switching elements 45B-45N is present at each of the remaining N-1 groups, each comprising n number of optically tunable wavelength filters. Each optical switching element is an n x M switch. Each switching element 45A-45N thus functions as an output link switch, by virtue of the fact that it connects the different wavelength channels on the inputs to M number of different output links. To this end, there are used M number of optical couplers 34A-34M of the type N:1, each having N number of inputs 36A1-36AN, ..., 36M1-36MN. The output of each optical coupler is connected to a respective one of the output links 24A-24M. Depending on the path established through the switching elements 45a-45N, signals from one, two or maximally right up to N number of switching elements will depart on the optical link 24A. The same applies to each of the remaining optical couplers 34B-34M. It will therefore be seen that each switching element 45A-45N has access to each of the output links 24A-24M. A maximum of n different wavelength channels can be transmitted on a respective output link simultaneously. The outputs from the optical couplers 34 are connected to outputs 38A-38M of the optical switch 30. Connected to each of these outputs is a respective one of the output optical links 24A-N. All wavelength channels which are addressed to the same output optical link are switched in the optical switch 30 to the same output of the switch. No collision will occur, since all wavelength channels are coded with unique wavelengths in one and the same switching element 45. Each switching element 45A-N can include a laser amplifier in the switch structure when the switching element is semi-conductor based, e.g. InP.

If the switching elements are of semiconductor type then optical laser amplifiers may be integrated in the switching elements in order to compensate for power losses.

If optical laser amplifiers are used as specified in the preceding section then cross-talk between different wavelength channels occurs if said wavelength channels are passing through one and the same optical laser amplifier. An optical switch designed in accordance with the invention has solely unique wavelength channels at the inputs 43 of the switching elements. Provided the internal structure of the switching elements is such that the wavelength channels during their passage through the laser amplifiers are kept separated, then cross-talk will not appear. As an example of a possible internal switch structures reference is made to the known tree structure or to the structure described in the aforesaid publication Technical Digest, page 178.

The optical switch illustrated in FIG. 2 also includes a control unit 40 provided with a processor and software, partly for establishing coupling paths through the switching elements 45A-N and partly for tuning the N+N+M groups each comprising n number of tunable wavelength filters 25, 39 and 26. Control signals for setting-up a connection and for wavelength tuning are transmitted over a separate signal network separate which is individual to the network in which the optical links are included. The signal network used is normally an existing cable and/or radio link network. The control unit and its processor assign a wavelength to the transmitter and tune the transmitter wavelength filter. The receiver is assigned the same wavelength and is tuned to this wavelength. Finally, the control unit sets-up paths through the switch, by tuning a wavelength filter 39 and opening a path through a switching element 45 which leads to the link 24 that leads to the receiver. This procedure takes place for each transmitter-receiver pair.

Figure 3:
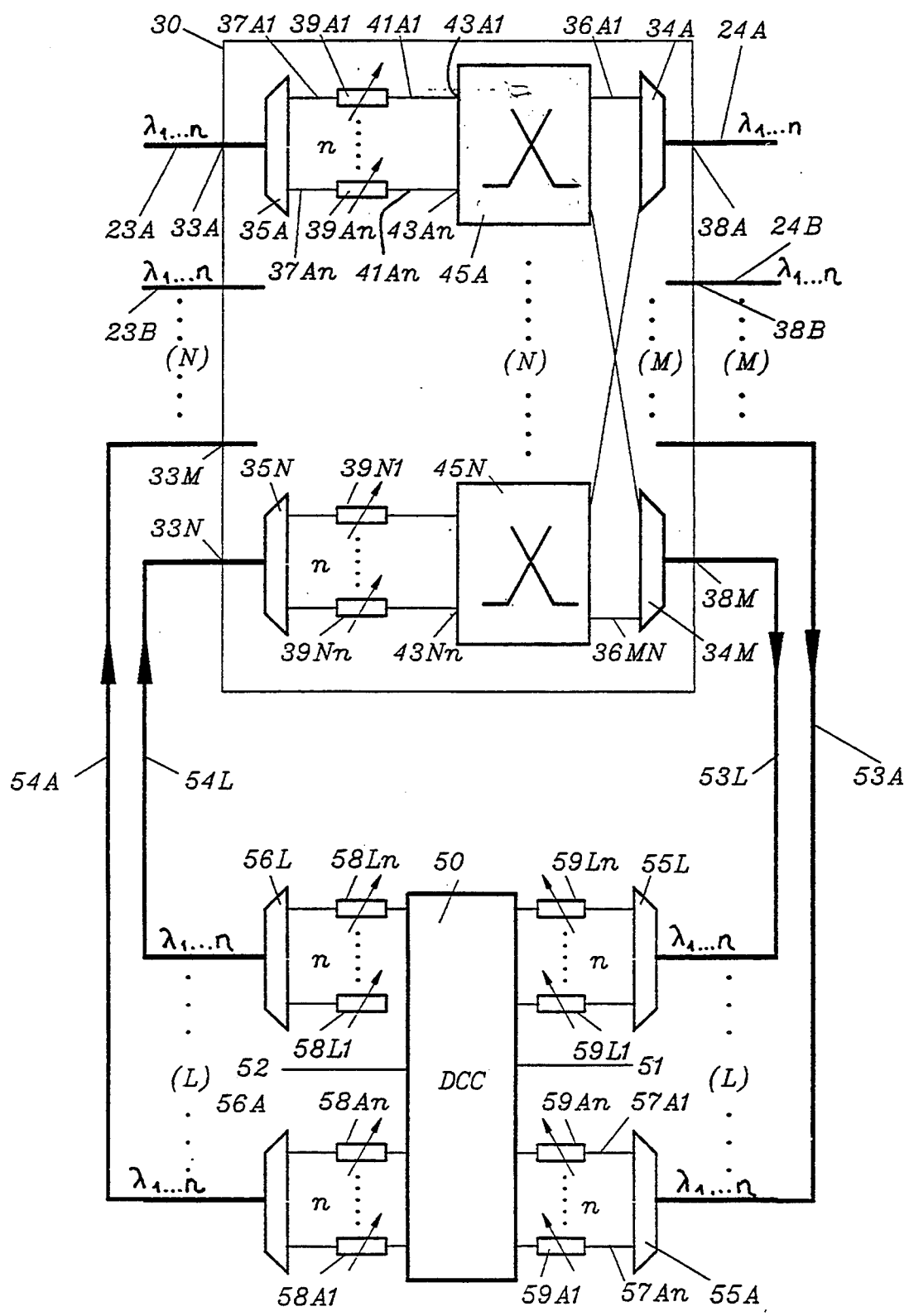
FIG. 3 illustrates a modified embodiment of the invention in which a digital cross connector is connected to an optical switch according to FIG. 2, in order to form an optical cross connector.

FIG. 3 illustrates an application of the inventive optical switch in which the switch is included in a network node of a trunk network and functions as an optical cross connector which directs the major part of the network traffic through the switch and cross connects the input links and their respective wavelength channels as a whole. For example, all optical signals on the input link 23A can be switched by the switch 30 so that all of said signals will exit on the output optical link 24B.

However, it is desirable in some cases to redistribute certain wavelength channels on an input link among several output links, and to this end the switch 30 is provided with a digital cross connector 50 having an input side 51 and an output side 52. A predetermined number, L number, of input links 53A-53L are connected to a corresponding number of the outputs 38 of the switch 30, and a corresponding number, L number, of output links 54A-2 are connected between the output side of the cross connector 50 and a corresponding number of inputs 33 on the input side of the switch 30. Each of the L number of input links 53A-L passes to a respective optical splitter 55A-55L. All of the wavelength channels occurrent on the optical input link 53A are split, for example in the splitter 55A, into n number of branches 57A-57n. Thus, all wavelength channels found on the optical link 53A will be found in each such branch. Correspondingly, the input link is split into n number of branches in remaining optical splitters 55, of which the branches obtained in the splitter 55L are referenced 55L1-55Ln. A respective optically tunable wavelength filter is included in each branch 57A1-57Ln, . . . , 57L1-57Ln.

Each output link 54A, 54L from the digital cross connector is connected to a respective optical coupler 56A-56L of the type n:1. Thus, there are L number of optical couplers. Connected between each optical coupler and the output side of the digital cross connector is L number of groups, each comprising n tunable optical wavelength filters 58A1-58An, . . . , 58L1-58Ln.

All wavelength filters 58 and 59 can be tuned to any wavelength selected from among the aforesaid 2n-1 wavelengths. Wavelength multiplexed signals which arrive, e.g., on the optical link 53A are split in the optical splitter 55A into n number of branches and the wavelength filter in each such branch allows only one wavelength to pass through, which enters the digital cross connector where the signal is demultiplexed and redistributed for transmission on new, separated wavelength channels. These new wavelength channels are transmitted to the optical switch 30, where they are again switched out in the trunk network. If, for instance, a part of the signal on input link 53A and a part of the signal on input link 53L, which two signals lie on different wavelengths but are to be switched to the same output link, do not each per se fill a new wavelength channel, the digital cross connector packs the signals together in a single wavelength channel. This utilizes the channel resources to a better effect.

For the sake of clarity, the control unit 40 is not shown in the FIG. 3 illustration, said control unit functioning to tune each of the wavelength filters 37, 58 and 59 included in the optical cross connector 30, 50.

It will be understood that the invention is not restricted to the described and illustrated embodiments and that modifications can be made within the scope of the following claims.

I claim:

1. An optical switch for switching wavelength multiplexed optical signals between N input links and M output links, each transmitting wavelength multiplexed signals, comprising:

N input terminals each for connection to a first end of a respective one of said input links;

M output terminals each for connection to a first end of a respective one of said output links;

N first optical splitters each connected to a respective input terminal for splitting the signals at each of the input terminals into n branches to form N groups of n branches each;

N first groups of n tunable optical wavelength filters, each group of tunable wavelength filters being connected to said n branches of a respective optical splitter, each optical wavelength filter in each group forming a wavelength channel;

N optical switching elements each connected to outputs of a respective group of first tunable optical wavelength filters;

M first optical couplers, each of which is arranged between a respective output terminal and a respective optical switching element for coupling optical signals from predetermined switching elements to said output terminals;

control means for controlling the first tunable optical wavelength filters and for controlling the optical switching elements;

N groups of n transmitters for transmitting optical signals each on a different wavelength within each transmitter group;

N second optical couplers, each being arranged between a respective group of transmitters and a second end of a respective one of said input links;

M groups of n receivers for receiving optical signals each on different wavelength within each receiver group; and M second optical splitters, each being arranged between a respective group of receivers and a second end of a respective one of said output links;

wherein said control means controls said first tunable wavelength optical filters, said transmitters and said receivers, selecting wavelengths for each from among 2n-1 different wavelengths so as to prevent two identical wavelengths from occurring simultaneously in any one of the input links and output links.

2. An optical switch according to claim 1, wherein each transmitter includes a respective second tunable optical wavelength filter; and each receiver includes a respective third tunable optical wavelength filter.

3. An optical switch according to claim 2, wherein each of the first, second and third tunable optical wavelength filters can be tuned to each of said 2n-1 different wavelengths.

4. An optical switch according to claim 3, wherein each tunable optical wavelength filter includes an optical amplifier.

5. An optical switch according to claim 4, wherein the optical amplifier is a laser of one of the Distributed Bragg Flector and Distributed FeedBack types and is pumped optically to a moderate extent.

6. An optical switch according to claim 5, wherein each optical switching element includes optical amplifying elements, each of which amplifies a single wavelength channel.

7. An optical switch according to claim 6 in which each optical switching element includes n inputs and M outputs and means for establishing a connection between a selected input and a selected output wherein each input of an optical switching element is connected to a respective one of said n wavelength channels in a group.

8. An optical switch according to claim 7 in which each first optical coupler (34A-34M) has N inputs and one single output, wherein each of the inputs to said M first optical couplers is connected to a respective one of said M outputs of a respective one of said N optical switching elements.

9. An optical cross connector comprising an optical switch according to claim 1, in which the input and output links are included in a network of trunk lines which conduct wavelength multiplexed optical signals, further comprising:

a digital cross connector having an input side and an output side;

L third optical splitters, each connected to a respective predetermined output optical link;

L first wavelength filter groups, each comprising n third tunable optical wavelength filters, wherein each wavelength filter group is connected between a respective splitter on the input side of the cross connector and each wavelength element in each group forms a wavelength channel;

L third optical couplers, each having an output and n inputs, wherein each output is connected to a respective input of first optical splitters, predetermined from among said N first optical splitters;

L second wavelength filter groups, each comprising n tunable optical wavelength filters, wherein each second wavelength filter group is connected between a respective third optical coupler and the output side of the digital cross connector;

said control means being also arranged to control the first and the second groups of optical wavelength elements so as to redistribute optical signals on the predetermined output links to inputs selected from the predetermined optical splitters at the optical switch.

* * * * *